Nov. 10, 1925.
C. H. DODGE
1,561,313
TRUCK UNDERFRAME CONSTRUCTION
Filed July 20, 1925
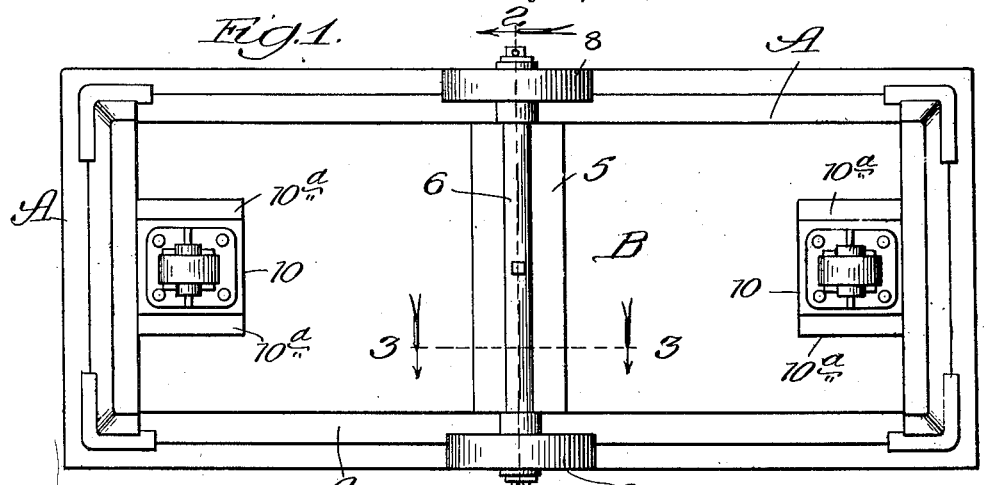
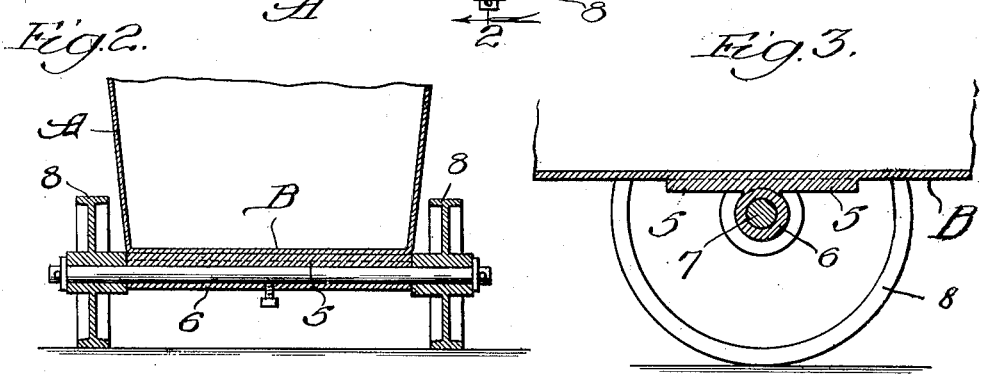
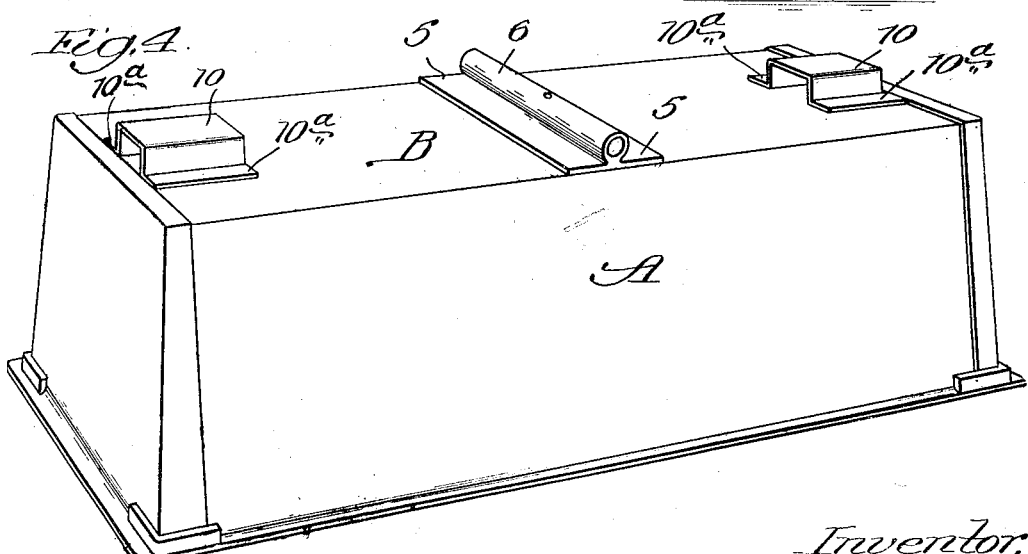
Inventor:
Charles H. Dodge, Patented Nov. 10, 1925.

1,561,313

UNITED STATES PATENT OFFICE.

CHARLES H. DODGE, OF CHICAGO, ILLINOIS.

TRUCK UNDERFRAME CONSTRUCTION.

Application filed July 20, 1925. Serial No. 44,780.

*To all whom it may concern:*

Be it known that I, CHARLES H. DODGE, a citizen of the United States, residing at Chicago, in the county of Cook and State of Illinois, have invented a new and useful Improvement in Truck Underframe Constructions, of which the following is a specification.

My invention relates to an improvement which I have particularly devised for the underframe construction of sheet-metal trucks used for wheeling meat about in the plant.

In this type of truck as now in extensive use, the axle, which extends rigidly across the center of the sheet-metal bottom, is of angular cross-section and is rigidly secured between a pair of angle-bars bolted through the truck-bottom and through the axle, and has the trunnions formed on its projecting ends for journaling the wheels. That construction is objectionable, because it provides numerous angles, crevices and projections for gathering particles of the meat; and the heads on the inner ends of the bolts also obstruct the shoveling-out operation in emptying the truck. The truck is thus rendered unsanitary and does not comply with the strict Government requirements with regard to being sanitary, since the meat lodged in the numerous places referred to tends to become spoiled and thus to cause contamination.

It is my purpose to avoid these and other objections and to afford additional advantages by the improved construction hereinafter described and illustrated in the accompanying drawing, in which—

Figure 1 is a bottom plan view of a sausage-meat truck provided with my improvement;

Figure 2 is broken view showing a section on line 2—2, Fig. 1;

Figure 3 is a similar view of an enlarged section on line 3—3, Fig. 1, and

Figure 4 is a perspective view of the truck-body shown in inverted position and provided with my features of improvement.

The truck-body A is formed of sheet-metal about one-eighth inch thick. On the bottom B of the truck I provide a steel reinforcing plate 5, about six inches wide and three-eighths of an inch in thickness, to extend across the transverse center of the bottom, and which is welded in place. A hollow cylindrical bearing 6, of steel, is welded to the plate 5 to extend along its center for rotatably housing the cylindrical axle 7 and affording trunnions for the truck-wheels 8 journaled thereon.

By the boltless underconstruction thus described, not only are all meat-fiber gathering projections, crevices and the like, and obstructions on the inner truck-bottom avoided, but the plate 5 reinforces and supplements the thin-metal bottom B to prevent the axle, which in time wears through the bearing 6, from wearing through the bottom of the truck and thus impairing it for further use. Moreover, when the axle-trunnions become worn, a suitable cylindrical rod is always likely to be handily available, at or near the place of use of the truck, for a new axle, whereas with the former construction, referred to, the worn-out trunnions render the angular axle unfit for further use, thus requiring the truck to be sent to a factory, usually that of the manufacturer, for a new axle of the same construction.

The casters usually provided centrally on the opposite ends of the bottom B of a truck of the present type, are secured on bearings 10 affording a further improvement in my underframe construction. This bearing, which is of sheet-steel, is of rectangular form and has base-flanges 10$^a$ at which it is welded to the truck-bottom, thereby reinforcing it, the caster being riveted or bolted through its base to the raised bearing instead, as in the aforesaid former construction of the underframe, of being bolted through the truck-bottom with the resultant disadvantage of presenting obstruction and meat-lodgment points on its inner surface.

I realize that considerable variation is possible in the details of construction of my invention thus shown and described, and I do not intend to be limited thereto except as pointed out in the appended claims, in which it is my intention to claim all the novelty inherent in my invention as broadly as permissible by the state of the art.

I claim—

1. In combination with the sheet-metal bottom of a truck of the character described, a boltless underconstruction comprising a reinforcing plate welded to the exterior of said bottom to extend across its central portion, and a cylindrical tubular axle-bearing welded to said plate to extend lengthwise thereof.

2. In combination with the sheet-metal bottom of a truck of the character described, a boltless underconstruction comprising a reinforcing plate welded to the exterior of said bottom to extend across its central portion, a cylindrical tubular axle-bearing welded to said plate to extend lengthwise thereof, and rectangular flanged caster-bearings welded at their flanges centrally to the opposite end-portions of said bottom.

CHARLES H. DODGE.